April 4, 1950 F. W. FRINK 2,502,447
AUTOMATIC DIRECTION FINDER
Filed Oct. 16, 1945 4 Sheets-Sheet 1

INVENTOR.
FREDERICK W. FRINK
BY Percy P. Lantzy
ATTORNEY

INVENTOR.
FREDERICK W. FRINK
BY
ATTORNEY

Fig. 8.
Fig. 9.
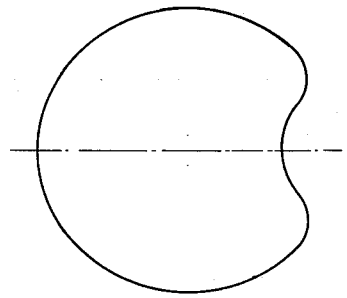
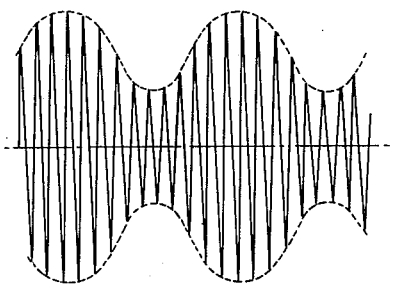
Fig. 10.
Fig. 12.
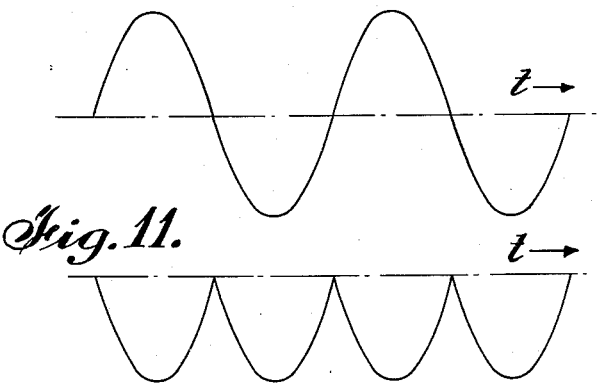
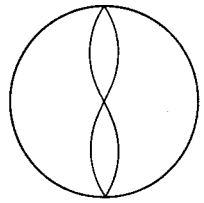
Fig. 11.
Fig. 13.　Fig. 14.　Fig. 15.　Fig. 16.
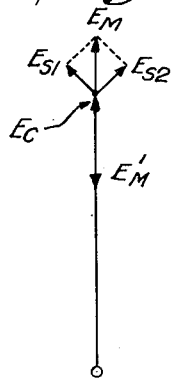
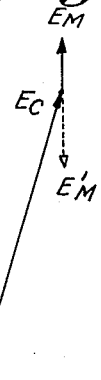
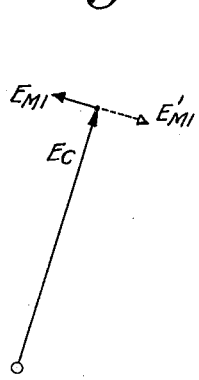
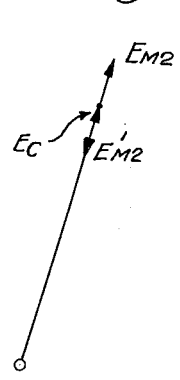
INVENTOR.
FREDERICK W. FRINK
BY
ATTORNEY April 4, 1950     F. W. FRINK     2,502,447
AUTOMATIC DIRECTION FINDER Filed Oct. 16, 1945     4 Sheets-Sheet 4

INVENTOR.
FREDERICK W. FRINK
BY
ATTORNEY

Patented Apr. 4, 1950

2,502,447

UNITED STATES PATENT OFFICE 2,502,447

AUTOMATIC DIRECTION FINDER

Frederick W. Frink, East Orange, N. J., assignor to Federal Telephone and Radio Corporation, New York, N. Y., a corporation of Delaware Application October 16, 1945, Serial No. 622,606

8 Claims. (Cl. 343—118)

This invention relates to automatic direction finders for producing a continuous indication of the direction from which radio signals are received.

The invention is concerned with direction finders, for example, of the type using a cathode ray tube indicator or oscilloscope having a single beam deflecting system which may be rotated about the axis of the tube, and a directional receiving element, such as a goniometer coil or a rotary loop antenna, is rotated synchronously with the rotation of the deflecting system of the oscilloscope. Direction finders of this type produce a continuous pattern on the screen of the oscilloscope which serves to indicate the direction from which waves are being received.

One object of the invention is to provide an arrangement which will produce directional indications which are sharper, clearer and more accurate than those heretofore produced.

Another object of the invention is to devise a direction finder in which the ambiguity of the indication is eliminated.

A still further object of my invention is to provide a direction finder wherein the effects of unbalance of the directive antenna will be minimized.

My invention will be described in connection with the accompanying drawing in which:

Figs. 1, 2 and 3, are diagrams showing the reception pattern of the conventional direction finder under different conditions, and Figs. 4, 5 and 6, are diagrams showing the oscilloscope patterns produced by the reception patterns of Figs. 1, 2 and 3, respectively;

Figs. 8 and 12 are diagrams of the reception pattern and oscilloscope pattern respectively of a direction finder incorporating my invention;

Fig. 9 shows the signal wave applied to the mixed stage of Fig. 7;

Fig. 10 shows the output wave from the detector of Fig. 9;

Fig. 11 illustrates the rectified wave which energizes the deflecting system of the oscilloscope;

Figs. 13 to 16 are vector diagrams useful for explaining the effect of extraneous vertical antenna effects in the direction finder;

Figure 1:
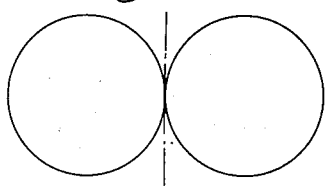
Figure 4:
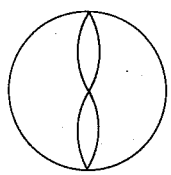

In the automatic direction finders of the type referred to above, a rotatable loop of two crossed loops and associated goniometer is used to obtain a directional pattern of the type shown in Fig. 1, and the pattern produced on the oscilloscope screen by rotation of the goniometer coil and the beam-deflecting system is as shown in Fig. 4.

Figure 2:
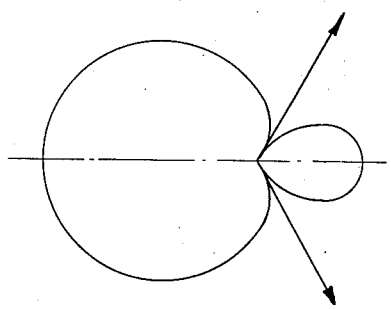
Figure 5:
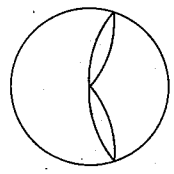
Figure 3:
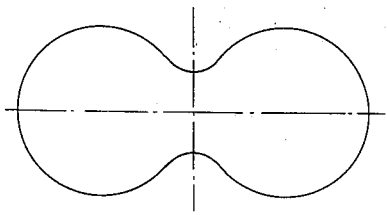
Figure 6:
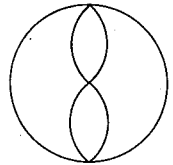

Extraneous unbalance effects, commonly termed antenna effects, tend to produce distortion in the indicated pattern. If there is some extraneous vertical antenna effect or unbalance in the goniometer, the transmission line, or some other part of the system, and the voltage produced by the vertical antenna effect is in phase with the voltage from the loop antenna, a reception pattern similar to that of Fig. 2 might be obtained, and the cathode ray pattern might be as shown in Fig. 5. On the other hand, if the voltage due to the vertical antenna effect is 90 degrees out of phase with the voltage from the loop antennas, the directional pattern will be as shown in Fig. 3, with very broad nulls, and the cathode ray pattern will have broad points, as shown in Fig. 6. It is this broadening which the present invention is intended to avoid.

The distortion effects may be explained by considering the envelope produced by rotation of the directive antenna as a modulation of the received carrier wave. Any disturbing parallel or unbalance voltages tend to produce a change in the pattern similar to overmodulation of a carrier wave. In accordance with my invention, an omni-directional effect is purposely introduced and made of sufficient amplitude so that any unbalance voltages will in effect alter the carrier level but never sufficiently to produce the effective overmodulation or distortion.

Figure 7:
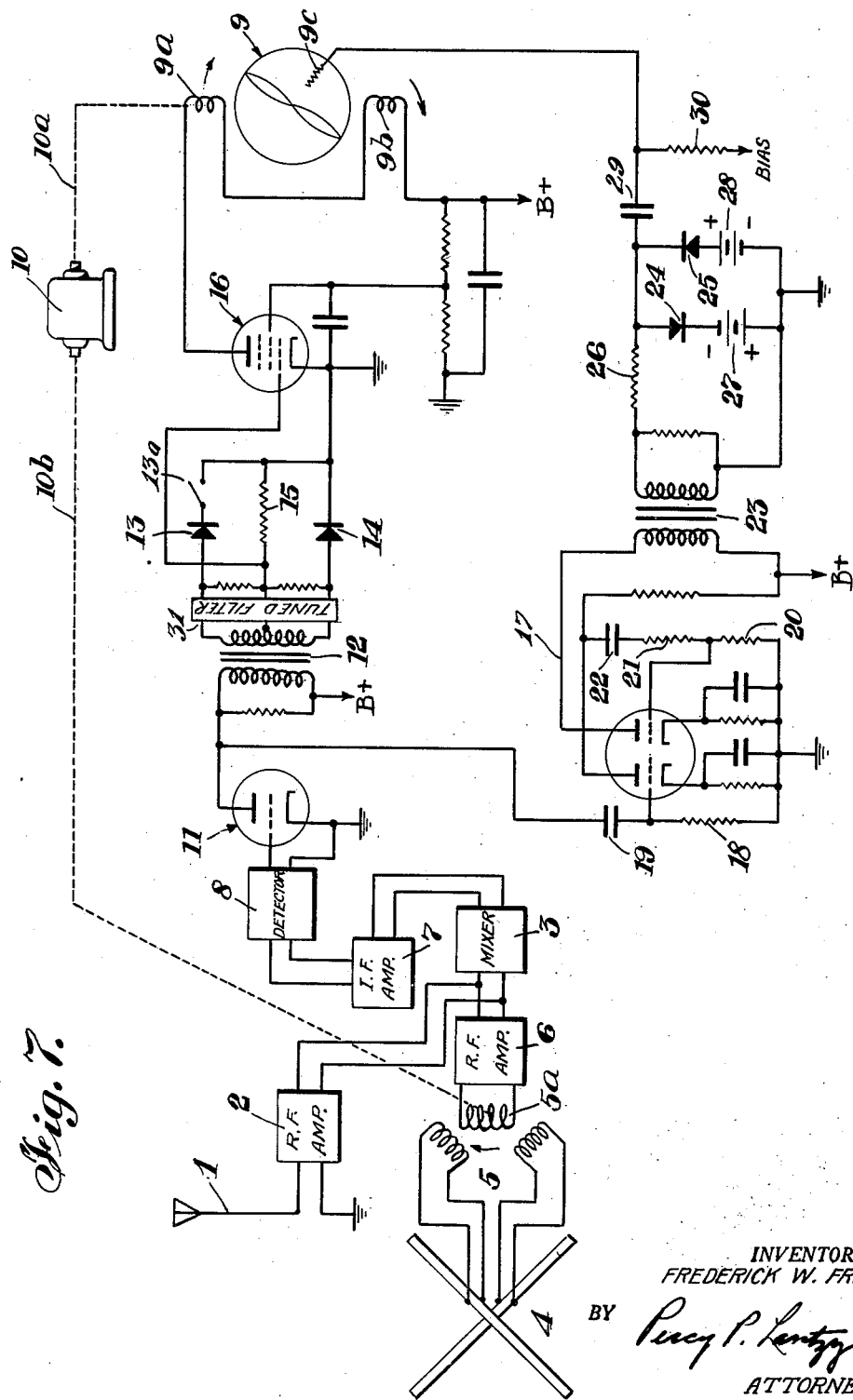
Fig. 7 is a schematic diagram illustrating a preferred embodiment of the invention.

One arrangement for carrying out the present invention is shown in the simplified schematic diagram of Fig. 7. Signals received over omnidirectional antenna 1 are amplified at 2 and supplied to the input of mixer 3. Simultaneously, signals received in the crossed loop antenna array 4 are supplied to the goniometer 5 having a rotary coil 5a connected to amplifier 6, the output of which is connected to the input of mixer 3. The output of mixer 3 is amplified by intermediate frequency amplifier 7, is detected at 8 and audio frequency current is supplied to an amplifier. A portion of the audio frequency is transmitted through special rectifier circuits to be described in detail below and energizes a pair of deflecting coils 9a and 9b of a cathode ray tube 9. These coils are mounted for rotation about the axis of the tube 9 and are continuously rotated by any suitable motor represented at 10 through a connection represented by the dotted line 10a. Goniometer coil 5a is rotated synchronously with the deflecting coils by means of a suitable connection represented by the dotted line 10b. Other details of the arrangement shown in Fig. 7 will appear hereinafter.

The omni-directional antenna 1 is permanently connected to the receiver, and is adjusted so that the voltage supplied to the receiver is considerably greater than the maximum voltage supplied from the loop antennas. The omni-directional voltage must be enough greater than the maximum directive antenna voltage so that the unbalance or antenna effects, even when in phase opposition will not reduce the effective carrier to zero; for example, it might be made three times as great. The directional pattern obtained by rotating the rotor of the goniometer is as shown in Fig. 8. It has a slight resemblance to a cardioid, but it does not have a true null.

The resultant signal voltage applied to the mixer 3 when the rotor of the goniometer is continuously rotated is as shown in Fig. 9. If the speed of the goniometer is 30 revolutions per second, the modulation envelope shown in Fig. 9 is a sine wave having a frequency of 30 cycles per second. It will be noted that the depth of modulation corresponds to considerably less than 100%. Th phase of this sine wave depends on the direction from which the signals are being received, and the cathode ray indicator serves essentially as a phase meter, in a manner that will be described.

The output of the detector 8 is a 30 cycle sine wave, as shown in Fig. 10. This voltage is amplified by amplifier 11, and after passing transformer 12 is rectified by the full-wave rectifier comprising the two individual rectifier elements 13 and 14. The voltage generated across resistor 15 is as shown in Fig. 11. The pulse frequency of this rectified wave is equal to twice the speed of rotation of the deflecting system of the oscilloscope. Each rectified sine wave pulse drives the grid of amplifier 16 negative decreasing the voltage in coils 9a and 9b. The resultant oscilloscope pattern is as shown in Fig. 12. Since the "nulls" of this pattern are produced by rectification, they will always remain sharp, provided a strong enough signal is received, and provided that the rectifier circuit will pass the necessary higher harmonics.

It is advisable to load transformer 12 heavily with resistance, to improve the frequency characteristic of the rectifier circuit. There will be a slight phase shift of the 30 cycle sine wave due to the magnetizing current of transformer 12, but since this phase shift is constant it can be compensated by changing the position of the azimuth scale of the indicator. An alternative is to shunt a condenser of sufficient capacity to draw a leading current equal to the lagging current of the transformer across the primary coil of the transformer. The function of amplifier 17 and its associated circuits will be explained later.

Consideration will now be given to the possible effects produced by extraneous unbalance or antenna effect in the goniometer, the transmission line, or in other parts of the apparatus. A large amount of vertical antenna effect is already present due to the vertical antenna itself, and if the extraneous antenna effect is in phase with that due to the vertical antenna, or 180 degrees out of phase with it, the only effect is a slight change in the per cent modulation (30 cycle) of the resultant signal, and this does no harm. If the voltage due to extraneous effect is 90 degrees out of phase with the voltage from the vertical antenna, the results can best be understood by reference to the vector diagrams shown in Figs. 13, 14, 15 and 16.

So far as the 30 cycle modulation is concerned, the goniometer produces only side frequencies, while the carrier wave is obtained from the vertical antenna. It is well known that the relation between carrier and side frequencies can be represented by a vector diagram as in Fig. 13. Vector $Ec$ represents the carrier wave, and vectors $Es1$ and $Es2$ represent the side frequencies. Vectors $Es1$ and $Es2$ rotate in opposite directions at the same speed, relative to vector $Ec$, and their resultant $Em$ varies between positive and negative limits, causing the amplitude of the resultant vector to be modulated.

Now, let us suppose that there is some extraneous vertical antenna effect somewhere in the system, and that the voltage due to this extraneous effect is 90 degrees out of phase with the voltage from the vertical antenna. This causes the phase of the carrier wave to be shifted slightly, as shown in Fig. 14, and the modulation vector, which varies between the values $Em$ and $E'm$, is no longer parallel to the carrier wave vector $Ec$. The effect of this is to produce a certain amount of phase modulation along with the amplitude modulation, but this does not have much effect on the output voltage of the detector, because the detector is not responsive to phase modulation. The modulation vector $Em$ may be considered as made up of two components. One of these is $Em2$, which is parallel to vector $Ec$, as shown in Fig. 16, and this component produces only amplitude modulation. The other component, $Em1$, which is perpendicular to $Ec$, is shown in Fig. 15. If $Ec$ is large compared with $Em1$, the modulation produced by $Em1$ is almost entirely phase modulation, and this has no effect in the detector. It can thus be seen that an appreciable amount of extraneous vertical antenna effect can be present without producing any appreciable effect on the phase of the 30 cycle output voltage of the detector, even if the extraneous voltage is 90 degrees out of phase with the voltage produced by the vertical antenna.

As shown in Fig. 12, the pattern produced on the oscilloscope has two lobes, and while the axis of these two lobes indicates the line along which waves are being received, there is an ambiguity as to the sense or direction of the reception. In this system, the use of a normal sensing antenna cannot overcome the ambiguity as the omni-directional antenna already has provided an excess of this type of voltage. The true direction of reception may be obtained, however, by providing a switch 13a in the circuit of rectifier 13 (or 14), and by opening this switch one of the lobes in Fig. 12 will be eliminated, thus producing a pattern according to Fig. 18 which would indicate the direction from which the waves are being received in a manner analogous to the normal sensing circuit.

Instead of using a manual operation to eliminate one of the lobes of the pattern of Fig. 12, this may be done automatically by using amplifier 17 and its associated equipment. As shown, this amplifier is a double triode tube, and the input of the first section of the tube is supplied from the potential drop across resistance 18 which is connected in series with a condenser 19 and supplied from the output of amplifier 11. The condenser-resistance combination causes a 45° phase shift in the 30 cycle voltage supplied to the first section of amplifier 17. A condenser-resistance circuit formed of resistances 20, 21 and condenser 22 is bridged across the output of the first section of amplifier 17, and the potential drop across 20 is applied to the input of the second section of amplifier 17. The condenser-resistance combination produces a further phase shift of 45° in the 30 cycle voltage so that the output voltage of the second section of amplifier 17 is displaced in phase by 90° with respect to the voltage across the primary of transformer 12. The transformer 23 is connected in the output of the second section of amplifier 17, and the voltage across the secondary winding of this transformer is converted into a square top wave by means of rectifiers 24 and 25 connected in opposite directions across the secondary winding, a series resistance 26 being interposed between the transformer and the rectifiers. Oppositely poled batteries 27 and 28 are connected in series with rectifiers 24 and 25, respectively, for determining the voltage at which the rectifiers become conductive to currents from transformer 23. The square-top wave is applied to the grid 9c of the cathode ray tube 9 through condenser 29. The grid 9c is provided with a leak resistance 30.

Figure 17:
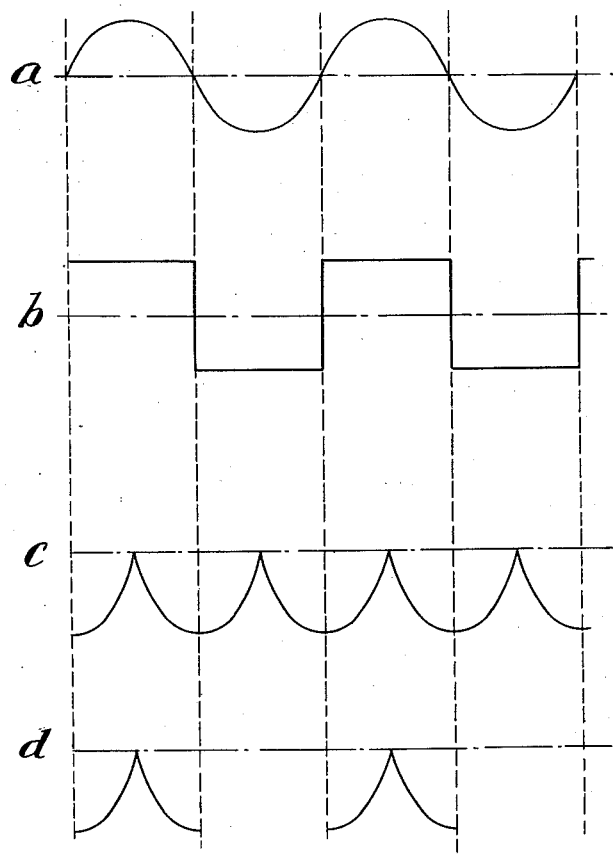
Fig. 17 is a series of wave form diagrams explaining the operation of the arrangement for blanking out one of the lobes of the oscilloscope pattern and for thereby eliminating the ambiguity in the direction indication.
Figure 18:
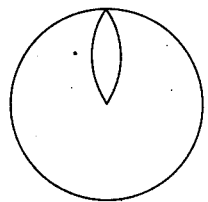
Fig. 18 shows the resulting pattern produced on the screen of the oscilloscope.

The operation of the blanking or blocking circuit including amplifier 16 is as follows:

In Fig. 17, the top curve $a$ represents the voltage across the secondary of transformer 23, and the curve $b$ represents the square-wave voltage applied to the grid of the cathode ray tube. The curve $c$ represents the rectified voltage across resistor 15, and the curve $d$ shows that portion of the voltage which is effective in producing a visible image on the screen of the cathode ray tube during the positive pulses of the blanking wave $b$, the negative pulses of wave $b$ serving to blank out or cut off the cathode beam during these pulses. The resultant image is as shown in Fig. 18. In this way ambiguity is avoided, and the separate manual operation for obtaining a sense indication is eliminated.

By inserting a thirty-cycle filter 31 between transformer 12 and rectifiers 13 and 14, any noise disturbances can be filtered out before the thirty-cycle wave is rectified, thereby improving the signal-to-noise ratio considerably and preventing distortion of the pattern on the scope by noise disturbances and without changing the shape of the pattern.

While I have illustrated the use of a goniometer in the modification shown in Fig. 7, it will be understood that the crossed loop antenna and goniometer combination may be replaced by a rotatable directive antenna such as a single loop or an Adcock type of antenna. Moreover, the principles of my invention may be applied to direction finder systems using indicators of types other than that specifically illustrated. The particular illustration herein is made merely by way of illustration and is not to be considered as a limitation on my invention as set forth in the objects thereof and in the accompanying claims.

I claim:

1. In a direction finder in which waves from an omni-directional antenna and from a bi-directional antenna element are combined, demodulated and then rectified into a pulsating wave which is supplied to a continuously rotating deflecting system of a cathode ray oscilloscope having an electron beam, and said directive antenna element is rotated synchronously with said deflecting system so that the pulsating wave energizing said deflecting system has a pulse frequency corresponding to twice the speed of rotation of said deflecting system, the method of eliminating one of the lobes of the pattern traced on said oscilloscope which comprises displacing the phase of said demodulated wave by 90° with respect to said rectified pulsating wave, and applying said displaced phase wave to said oscilloscope to suppress the beam therein during alternating pulsations of said displaced-phase wave.

2. In a direction finder embodying a cathode ray oscilloscope having an electron beam and a deflecting system rotating about the axis thereof at a predetermined speed and being energized by unidirectional pulses derived from a modulation wave having a frequency corresponding to said speed, the method of eliminating one of the lobes of the pattern traced on said oscilloscope which comprises displacing the phase of said modulation wave by 90° with respect to said derived unidirectional pulses, and applying said displaced-phase wave to said oscilloscope to suppress the beam therein during alternate pulsations of said displaced-phase wave.

3. In a direction finder, the combination of a rotary bi-directional antenna element, a cathode ray oscilloscope having an electron beam and a deflecting system rotatable about the axis thereof, means for synchronously rotating said deflecting system and said rotary antenna element at a predetermined speed, means for detecting waves received by said antenna and deriving therefrom a wave having a frequency corresponding to the speed of rotation of said rotary element, means for rectifying said modulation wave and energizing said deflecting system by said rectified wave, whereby a double-lobe pattern is produced on said oscilloscope, means for displacing the phase of said modulation wave to produce a quadrature phase relation with said rectified wave, and means for applying said quadrature wave to said oscilloscope to suppress the beam therein on alternate pulsations of said quadrature wave.

4. A direction finder according to claim 3 and including a filter tuned to the frequency of said detected wave and inserted between said detecting means and said rectifying means for suppressing noise disturbances on the pattern produced on said oscilloscope.

5. In a direction finder, the combination of a rotary bi-directional antenna element, a cathode ray oscilloscope having an electron beam and a deflecting system rotatable about the axis thereof, means for synchronously rotating said deflecting system and said rotary antenna element at a predetermined speed, an omni-directional antenna, means for combining waves from said omni-directional antenna and from said directional antenna element in an amplitude ratio such that the energy from said omni-directional antenna exceeds the maximum energy from said directional antenna by at least the amplitude of unbalance currents picked up thereby, means for detecting said combined waves and deriving therefrom a wave having a frequency corresponding to the speed of rotation of said rotary element, means for rectifying said modulation wave and energizing said deflecting system by said rectified wave, whereby a double-lobe pattern is produced on said oscilloscope, means for displacing the phase of said modulation wave to produce a quadrature phase relation with said rectified wave, and means for applying said quadrature wave to said oscilloscope to suppress the beam therein on alternate pulsations of said quadrature wave.

6. In a direction finder, the combination of a rotary bi-directional antenna element, an omni-directional antenna means for continuously rotating said bi-directional antenna element to impress a modulation frequency on the wave received by said omni-directional antenna element, means for detecting said wave and deriving therefrom a wave corresponding to said modulation frequency, and a tuned filter for receiving said modulation wave from said detecting means and suppressing disturbances transmitted with said wave, and rectifier means for converting said filtered wave into a wave formed of uni-directional pulses—a cathode ray oscilloscope having an electron beam, deflecting means for rotating the beam of said oscilloscope in synchronism with said bi-directional antenna, means to apply energy to said deflecting means according to the null points of said uni-directional pulses, means for deriving a control voltage wave by displacing the phase of the said detected wave by 90° with respect to said uni-directional pulses, and connections for applying said control voltage wave to the control electrode of said oscilloscope to suppress the beam therein during alternate null points of said uni-directional pulses.

7. In a direction finder, the combination of a cathode ray oscilloscope having an electron beam and a deflecting system rotating about the axis thereof at a predetermined speed, a wave source having a frequency corresponding to the speed of rotation of said deflecting system, rectifying means supplied from said source and producing a pulsating wave formed of a discrete current pulse for each alternation of said source and including connections for energizing said deflecting system by the null points of the said pulsating wave, means for deriving a controlled voltage wave by displacing the phase of the wave from said wave source by 90° with respect to said pulsating wave, and connections for applying said control voltage wave to the control electrode of said oscilloscope to suppress the beam therein during alternate null points of said pulsating wave.

8. A direction finder comprising a directive antenna, an omni-directional antenna, means for effectively continuously rotating said directive antenna, means for deriving from said omni-directional antenna energy at a level higher than the maximum level of the energy derived from said directive antenna by the amount of unbalance energy which may be extraneously picked up in said directive antenna, means for combining energy from said antennas to produce a resultant wave having modulation corresponding to the variations in said energy from said directive antenna, means for detecting said combined energies to derive an envelope wave corresponding to said effective modulation, means for rectifying said detected energy, a cathode ray oscilloscope having an electron beam, deflecting means for rotating the beam of said oscilloscope in synchronism with said directive antenna, means for applying said rectified energy to said oscilloscope to produce an indication means for displacing the phase of the modulation wave by 90° with respect to said rectified energy, and means for applying said displaced phase wave to said oscilloscope to suppress the beam during alternate pulsations of said displaced-phase wave.

FREDERICK W. FRINK.

REFERENCES CITED

The following references are of record in the file of this patent:

UNITED STATES PATENTS

| Number | Name | Date |
|---|---|---|
| 1,702,440 | Hinton | Feb. 19, 1929 |
| 1,991,443 | Becker | Feb. 19, 1935 |
| 2,171,432 | Hicks | Aug. 29, 1939 |
| 2,241,922 | Rensch | May 13, 1941 |
| 2,277,905 | Eaton | Mar. 31, 1942 |
| 2,388,262 | Ganiayre | Nov. 6, 1945 |
| 2,403,967 | Busignies | July 16, 1946 |